(12) United States Patent
Barton et al.

(10) Patent No.: US 7,191,984 B2
(45) Date of Patent: Mar. 20, 2007

(54) THERMAL DESIGN FOR SPACECRAFT MODULES

(75) Inventors: Mark Carl Barton, Linden, VA (US); Jonathon Miller, Sterling, VA (US)

(73) Assignee: AeroAstro, Inc., Ashburn, VA (US)

( * ) Notice: Subject to any disclaimer, the term of this patent is extended or adjusted under 35 U.S.C. 154(b) by 165 days.

(21) Appl. No.: 11/151,908

(22) Filed: Jun. 14, 2005

(65) Prior Publication Data

US 2006/0038082 A1    Feb. 23, 2006

Related U.S. Application Data

(60) Provisional application No. 60/579,231, filed on Jun. 14, 2004.

(51) Int. Cl.
*B64G 1/58* (2006.01)
(52) U.S. Cl. .................. 244/171.8; 165/41; 361/701
(58) Field of Classification Search ............ 244/158.1, 244/171.7–171.8; 165/41–44; 361/701–703
See application file for complete search history.

(56) References Cited

U.S. PATENT DOCUMENTS

| | | | |
|---|---|---|---|
| 3,411,041 A * | 11/1968 | Block ..................... | 361/701 |
| 3,749,156 A * | 7/1973 | Fletcher et al. ......... | 165/104.14 |
| 4,324,375 A * | 4/1982 | O'Neill ................... | 244/171.8 |
| 4,588,023 A * | 5/1986 | Munekawa ............. | 361/703 |
| 4,880,050 A * | 11/1989 | Nakamura et al. ...... | 165/41 |
| 5,372,183 A | 12/1994 | Strickberger | |
| 5,806,800 A * | 9/1998 | Caplin .................... | 244/171.8 |
| 5,806,803 A * | 9/1998 | Watts ...................... | 244/171.8 |
| 5,954,298 A * | 9/1999 | Basuthakur et al. .... | 244/171.8 |
| 5,979,833 A | 11/1999 | Eller et al. | |
| 6,206,327 B1 * | 3/2001 | Benedetti et al. ....... | 244/159.4 |
| 6,260,804 B1 | 7/2001 | Anderson et al. | |
| 6,283,416 B1 | 9/2001 | Fleeter et al. | |
| 6,293,499 B1 | 9/2001 | MacGillivray et al. | |
| 6,478,258 B1 * | 11/2002 | Yee ........................ | 244/171.8 |
| 6,726,151 B2 | 4/2004 | Hebert | |
| 7,118,076 B2 * | 10/2006 | Tjiptahardja et al. ... | 244/171.8 |

OTHER PUBLICATIONS

U.S. Appl. No. 11/151,906, filed Jun. 14, 2005, Jordan et al.
U.S. Appl. No. 11/151,909, filed Jun. 14, 2005, McDermott et al.

* cited by examiner

*Primary Examiner*—Galen Barefoot
(74) *Attorney, Agent, or Firm*—Robert M. McDermott, Esq.

(57) ABSTRACT

A thermal management system for a spacecraft module includes a baseplate and wall system that is precharacterized to provide a given level of thermal performance regardless of an orientation of the spacecraft relative to a source of solar energy. The system is characterized at a worst-case hot orientation, and at a worst-case cold orientation. The characterization provides a maximum temperature and a minimum temperature of components mounted on the baseplate as a function of the height of the walls. The height of the walls is selected to provide a suitable temperature range for the components, based on the power dissipation of the components. The system is designed to be symmetric, so that this temperature range is assured regardless of the orientation of the spacecraft.

30 Claims, 2 Drawing Sheets

VIEW K-K

THERMAL DESIGN FOR SPACECRAFT MODULES

This application claims the benefit of U.S. Provisional Patent Application 60/579,231, filed 14 Jun. 2004.

BACKGROUND AND SUMMARY OF THE INVENTION

This invention relates to the field of aerospace systems, and in particular to a general-purpose thermal design that is suitable for a variety of spacecraft missions.

The design of modules for use in a spacecraft conventionally requires a substantial effort in the field of thermal management. At any particular point in time, for example, one of the surfaces of a spacecraft may be facing the sun, and in a typical low-earth orbit receives well over a kilowatt of solar energy per each square meter of surface area facing the sun. At the same time, another surface of the spacecraft may be facing deep-space, at a temperature near zero degrees Kelvin.

U.S. Pat. No. 5,372,183, "THERMAL CONTROL ARRANGEMENTS FOR A GEOSYNCHRONOUS SPACECRAFT", issued 13 Dec. 1994 to Harold P. Strickberger, and incorporated by reference herein, presents an overview of conventional thermal control systems, and teaches a system wherein spacecraft components are mounted on specified "north" and "south" surfaces, which are defined as the surfaces that face deep space throughout an orbit cycle, and heat pipes are provided to reduce the temperature differential between these "north" and "south" panels. Other, east and west pointing, surfaces are provided with highly reflective surfaces to assure that the absorbed energy is substantially less than the reflected energy on these surfaces.

In the other thermal control systems disclosed in U.S. Pat. No. 5,372,183, information is also available with regard to the expected orientation(s) of the spacecraft throughout the mission. For example, the teachings of U.S. Pat. No. 4,880,050, "THERMAL MANAGEMENT SYSTEM" issued 14 Nov. 1989 to Nakamura et al., and incorporated by reference herein, is described as being well suited for spacecraft that continually rotate, and the teachings of U.S. Pat. No. 3,749,156, "THERMAL CONTROL SYSTEM FOR A SPACECRAFT MODULAR HOUSING" issued 17 Apr. 1972 to Fletcher et al. and incorporated by reference herein, is described as a technique wherein each surface of the spacecraft that is expected to face the sun comprises superconducting material, to prevent the transfer of heat to other surfaces.

Although mission-specific information regarding the orientation of the spacecraft relative to the sun is generally available during the design of the spacecraft, the need to depend upon such information to design a spacecraft module substantially hinders the design of 'general-purpose' modules that can be used on multiple spacecraft, and particularly hinders or precludes the design of modules that are independent of any particular mission.

It is an object of this invention to provide a thermal system for spacecraft modules that allows the modules to be used in a wide range of differing mission-profiles. It is a further object of this invention to provide a method of designing and assembling a spacecraft module that does not require a priori knowledge of the spacecraft module's orientation in an operational environment.

These objects, and others, are achieved by a thermal management system that includes a baseplate and wall system that is precharacterized to provide a given level of thermal performance regardless of an orientation of the spacecraft relative to the sun. The system is characterized at a worst-case hot orientation, and at a worst-case cold orientation. The characterization provides a maximum temperature and a minimum temperature of components mounted on the baseplate as a function of the height of the walls. The height of the walls is selected to provide a suitable temperature range for the components, based on the power dissipation of the components. The system is designed to be symmetric, so that this temperature range is assured regardless of the orientation of the spacecraft.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

As noted above, there is a need for a thermal management system that can be assured of providing a given thermal performance regardless of the orientation of a spacecraft relative to a source of environmental energy, such as the sun or the earth. It is well recognized that the thermal absorption of a spacecraft module is maximal on the surface(s) that faces the source of environmental energy, and thermal loss is greatest on the surface(s) that face deep space. These facts are conventionally used to optimize the thermal design of a spacecraft module, based on an a priori determination of which surface(s) on the module will be facing the sun during the mission, which will be facing the earth and which will be facing deep space. That is, in a conventional design, the temperature constraints required by the components are satisfied by mounting the components on surfaces that are not expected to undergo extreme thermal conditions, based on a knowledge of which surfaces will be facing toward or away from the environmental energy source during the mission, and by providing heat pipes and other conductors to route heat between the components and select surfaces.

In accordance with a first aspect of this invention, the thermal system is preferably symmetric with regard to an orientation of the spacecraft relative to the sun or earth, so that a priori knowledge of the expected orientations of the spacecraft is not required.

Figure 1:
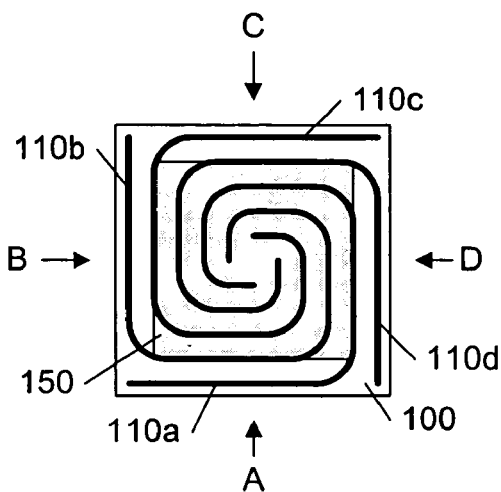
FIG. 1 illustrates an example baseplate design that provides symmetric thermal performance in accordance with this invention.

FIG. 1 illustrates an example symmetric design with respect to sides A, B, C, and D of a base 100. The base 100 includes heatpipes 110a–d that serve to conduct heat to/from each of these sides to a plate 150. Assuming that the plate 150 is thermally conductive and has a high thermal capacitance, the plate 150 can be expected to exhibit a substantially uniform temperature, or the variance in temperature across the plate 150 will be within given bounds. Because of the symmetric arrangement, the nominal temperature of the plate will be the same regardless of which side, A, B, C, or D faces the sun. That is, although the temperature of the plate will vary based, for example, on the angle at which the side faces the sun, this same temperature will occur on the plate regardless of whether the angle is relative to side A, B, C, or D. In like manner, the same thermal performance will occur regardless of which side, A, B, C, or D faces the earth and which side A, B, C, or D, faces deep space.

Figure 2A:
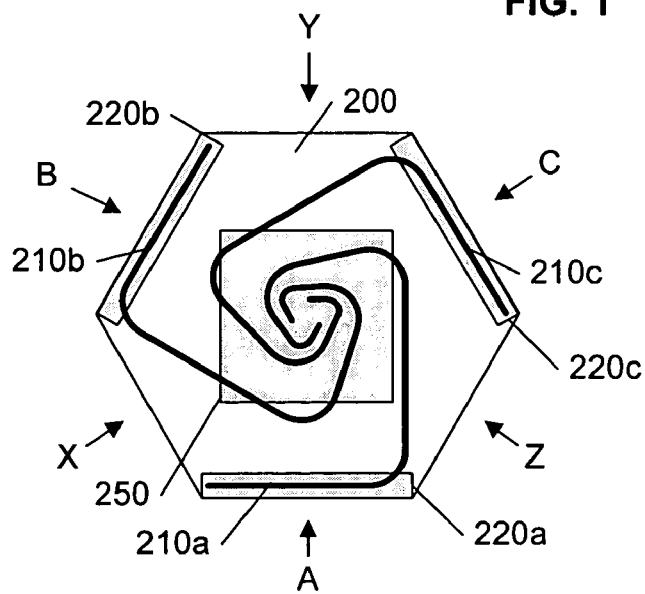
FIG. 2A illustrates another example baseplate design that provides symmetric thermal performance in accordance with this invention.

Note that the symmetry need not extend to all sides of the spacecraft. FIG. 2A illustrates a hexagonal shaped base 200, with three sides A, B, C that include heatpipes 210a–c, and three sides X, Y, Z that do not include heatpipes. The thermal performance of the base 200 will differ depending upon whether side A or side X faces the sun, but the symmetry of the heatpipes 210a–c assure that the same thermal performance will occur regardless of whether side A, B, or C faces the sun.

Figure 2B:
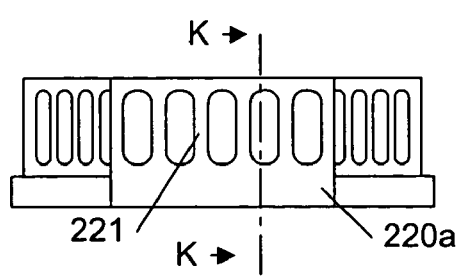
FIG. 2B illustrates an example wall system for use with the example baseplate design of FIG. 2A in accordance with this invention.
Figure 2C:
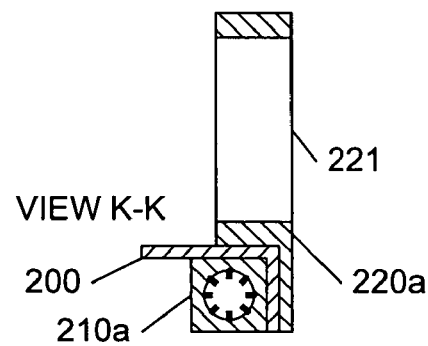
FIG. 2C illustrates an example cross section of the baseplate and wall system of FIG. 2B in accordance with this invention.

Hereinafter, the invention is presented using the paradigm of a hexagonal base with three heatpipes as illustrated in FIGS. 2A–2C, because such a configuration has been found to be particularly well suited for the principles of this invention, although one of ordinary skill in the art will recognize that the principles of this invention can be applied to any of a variety of shapes and configurations.

To facilitate the transfer of heat to/from the base at each side A, B, C, thermally conductive walls 220a–c are coupled to the heatpipes 210a–c at each side A, B, C. Preferably, these walls 220a–c include ribs 221 that facilitate heat transfer, as well as potentially providing structural support to the module. A cross-section view is illustrated in FIG. 2C. Preferably, the heat pipes 210a–c are grooved aluminum extrusions, as illustrated by the 'fins' within the heatpipe 210a in FIG. 2C, and are filled with ammonia as the working fluid. A silver thermal epoxy is preferably used to bond the heatpipes 210a–c to the base 200.

In the arrangement shown in FIGS. 2A–2C operates as follows. Any inflow of heat energy on a wall surface(s) 220a–c is communicated via the heatpipes 210a–c to the plate 250; any outflow of heat from the plate 250 is communicated via the heatpipes 210a–c to whichever surface(s) 220a–c are at a lower temperature than the plate 250. The plate 250 is preferably highly thermal-conductive, with a high thermal capacitance, so that with a given inflow and outflow of heat via the pipes 210a–c, the temperature variance across the plate is minimal, and the plate 250 is at a substantially uniform temperature, hereinafter termed the nominal temperature of the plate 250. This uniform temperature plate 250 serves as a mounting surface for components, and is hereinafter referred to as a component interface plate 250.

To provide efficient thermal transfer and high thermal capacitance, the component interface plate 250 is machined into the base 200. In a preferred embodiment, after mounting the components to the component interface plate, the interior surfaces are coated to facilitate thermal isolation, using, for example, low emissivity aluminum tape, and the exterior surfaces are coated to facilitate heat rejection, using, for example, silver teflon.

In the analysis presented hereinafter, it is assumed that the spacecraft module formed by the base 200, walls 220, and components that are mounted on the plate 250 is designed to form a module within a stack of modules, such as presented in copending U.S. patent application Ser. No. 11/151,906, "MODULAR SPACECRAFT DESIGN ARCHITECTURE", filed concurrently for Luis G. Jordan et al., and incorporated by reference herein. It is assumed that negligible thermal energy is received or dissipated orthogonal to the base 200. It is also assumed that sufficient thermal isolation is provided between modules, using, for example, thermally isolating washers (e.g. Ultem 1000) between any bolted-together surfaces, including the heads of bolts.

Given an estimate of the energy that is received at each surface 220a–c, the ambient temperature on the cold surfaces, the characteristics of the walls, heatpipes, and plate, and so on, the nominal temperature of the component interface plate 250 can be determined using conventional thermal analysis techniques and programs. Additionally, the increase in temperature at the plate 250 caused by energy dissipation by the components can also be determined using these thermal analysis techniques.

Because of the thermal symmetry of the preferred design, the task of determining the nominal temperature on the component interface plate 250 for varying orientations of the spacecraft is substantially reduced. And, because the source of solar energy, typically the sun, is a point source, and the surfaces 220a–c are symmetrically/uniformly distributed about the periphery of the base 200, the reception of solar energy due to a direct-facing of a surface to the sun is offset by the transfer of energy to at least one surface that is facing deep-space, or at least partially toward deep-space. With proper design, the peak temperature of the component interface plate 250 can be controlled to be within a given bound even under worst case heat-absorbing conditions.

In a typical low earth orbit, for example, the worst case hot condition will be experienced when one of the surfaces 220a–c is directly facing the sun and another surface 220a–c is directly facing the earth. The remaining surface 220a–c in this orientation must be facing deep space. In this orientation, there is generally a net heat-flow into the module. The temperature of the component interface plate 250 will be a maximum at this orientation when the components are generating their maximum heat dissipation. If it can be shown that this maximum temperature does not exceed the temperature limits of the components, then an overheating of the components due to this or any other spacecraft orientation cannot occur.

In like manner, the worst case cold condition will be experienced when none of the surfaces 220a–c faces the sun, and the earth-view is minimal. In this orientation, there is generally a net heat-flow out of the module. The temperature of the component interface plate 250 will be a minimum at this orientation when the components are not dissipating heat, and will increase with heat dissipated by the components. If a heater is provided that will dissipate heat to raise the minimum to above the minimum temperature limits of the components, then an unacceptable cooling of the components due to this orientation or any other spacecraft orientation cannot occur.

Thus, by designing the module base 200 and walls 220 such that a worst-case hot condition on the component interface plate 250 is below the maximum temperature limit of the components, and by providing a heater component such that a worst-case cold condition on the interface plate 250 is above the minimum temperature limit of the components, the component interface plate 250 is assured to be at an acceptable temperature regardless of the spacecraft's orientation. In determining the worst-case hot and/or cold conditions, other factors may also be taken into account. For example, if a wall 220a–c is on the same surface of the spacecraft as a solar panel, the reflections from the solar panel would be included in the determination of the worst-case hot condition. An advantage of placing the heatpipe walls 220a–c on alternate segments of the perimeter of the baseplate 200 is that the non-heat-piped walls can be positioned on the surfaces that include the solar panels, and the heatpipe walls 220a–c are place at gaps between the solar panels, to reduce the worst-case conditions.

It is noted that a base 200 with a defined heatpipe 210a–c and component interface plate 250 arrangement, the thermal characteristics of a module is primarily determined by the surface area of the walls 220a–c, and that the surface area of the surfaces 220a–c is directly affected by modifying the height h of the walls 220a–c.

As noted above, the worst-case hot environment is one in which one surface faces the sun, one faces the earth, and the other faces deep-space. This is another advantage of providing a three-thermal-surface arrangement. With such an arrangement, the ability of the module to shed the heat generated by the sun-facing surface from the other surfaces increases as the corresponding surface areas increase. That is, with at least three thermally-equivalent sides, the gradient of heat dissipation with increased area in a typical orbit is greater than the gradient of heat absorption with the same amount of increased area.

In a preferred embodiment, the maximum temperature of the component interface plate 250 is controlled by adjusting the height of the walls 220a–c. For the same base 200 with a given heatpipe 210a–c and component interface plate 250 arrangement, the maximum temperature on the component interface plate 250 will be directly dependent upon the height of the walls 220a–c, and directly dependent upon the amount of heat dissipated by the components on the plate 250. Thus, in accordance with this aspect of the invention, to provide a given maximum temperature for components dissipating a given amount of heat, one need only determine a required height of the walls 220a–c.

In a preferred embodiment, the base 200 with a given heatpipe 210a–c and component interface plate 250 arrangement is precharacterized for worst-case hot conditions at a variety of wall heights and at a variety of component heat dissipations. Using this precharacterization, the designer of the module merely identifies the expected heat dissipation of the components of the module, and then selects a corresponding wall height to use in order to keep the maximum temperature on the component interface plate to a desired level.

Figure 3A:
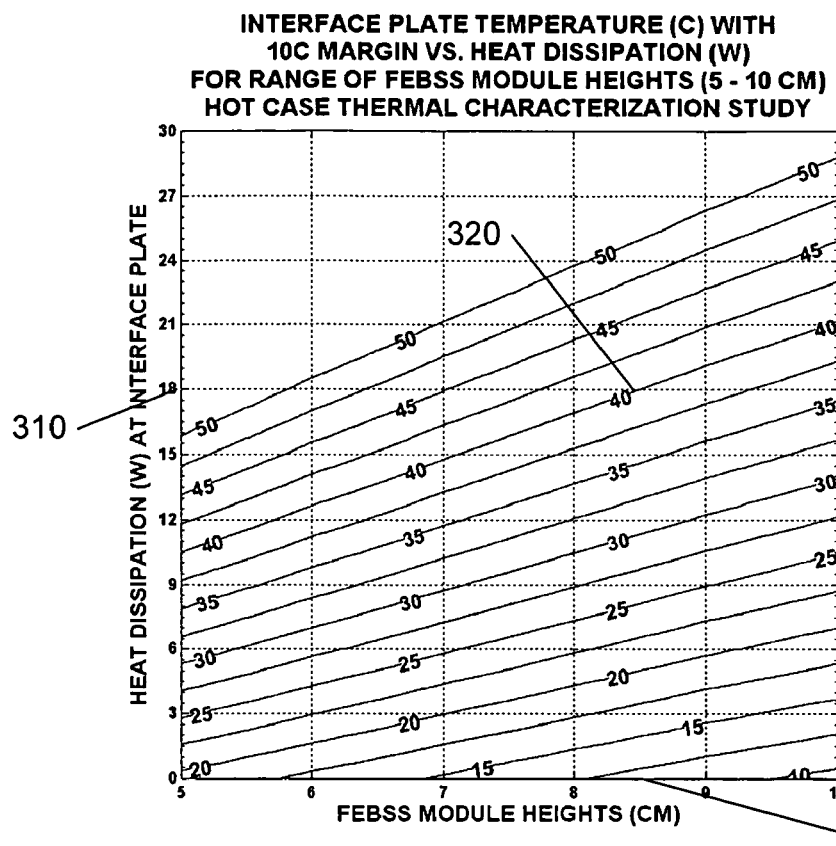
FIG. 3A illustrates an example worst-case hot characterization of an example baseplate and wall system in accordance with this invention.

FIG. 3A illustrates an example worst-case hot environment characterization of an example baseplate and wall system. The example graph presents the temperature at the component interface plate as a function of both the heat dissipation to the interface plate by the components (vertical axis), and the module height (horizontal axis). This example graph was produced for a particular baseplate and wall system under a particular set of assumed orbit conditions. Other graphs would be produced for other baseplate and wall systems, and other sets of assumed orbit or non-orbit conditions, using conventional thermal analysis techniques.

That is, for example, the example graph of FIG. 3A was produced for a base arrangement similar to that presented in FIGS. 2A–2C using grooved ⅜"×⅜" heatpipes with 1.5" bend radii, with ammonia as the working fluid, bonded to the baseplate with silver thermal epoxy, a component interface plate 250 machined into the base 200, etc., under an assumed low-earth orbit with worst-case solar exposure. A different base and wall system, such as illustrated in FIG. 1, under these same orbit conditions will provide a different graph, but similarly showing the temperature at the component interface at different heat dissipation levels and different wall heights. In like manner, the same baseplate and wall system under an assumed geosynchronous orbit with worst-case solar exposure will provide a different graph, but similarly showing the temperature at the component interface at different heat dissipation levels and different wall heights.

Given the precharacterization for a selected base and wall system for the defined orbit condition, the designer identifies the component heat-dissipation on the vertical axis, and then finds the height required to assure a maximum worst-case temperature. For example, if the designer has components that generate 18 watts, and cannot exceed 40° C., the designer identifies the 18 watts 310 on the vertical axis, then finds the intercept 320 of this vertical level with the 40° C. loci of points, then determines the horizontal coordinate 330 of this intercept point 320 as approximately 8.5 cm. Thus, with the base and wall system corresponding to this graph, an 8.5 cm wall height will provide sufficient thermal cooling under a worst-case orientation of the module in the assumed orbit so as to prevent the component interface plate from exceeding 40° C.

Having determined the required height of the walls to assure a maximum component plate temperature, the designer next determines the required heating components, if any, to assure a required minimum temperature.

Figure 3B:
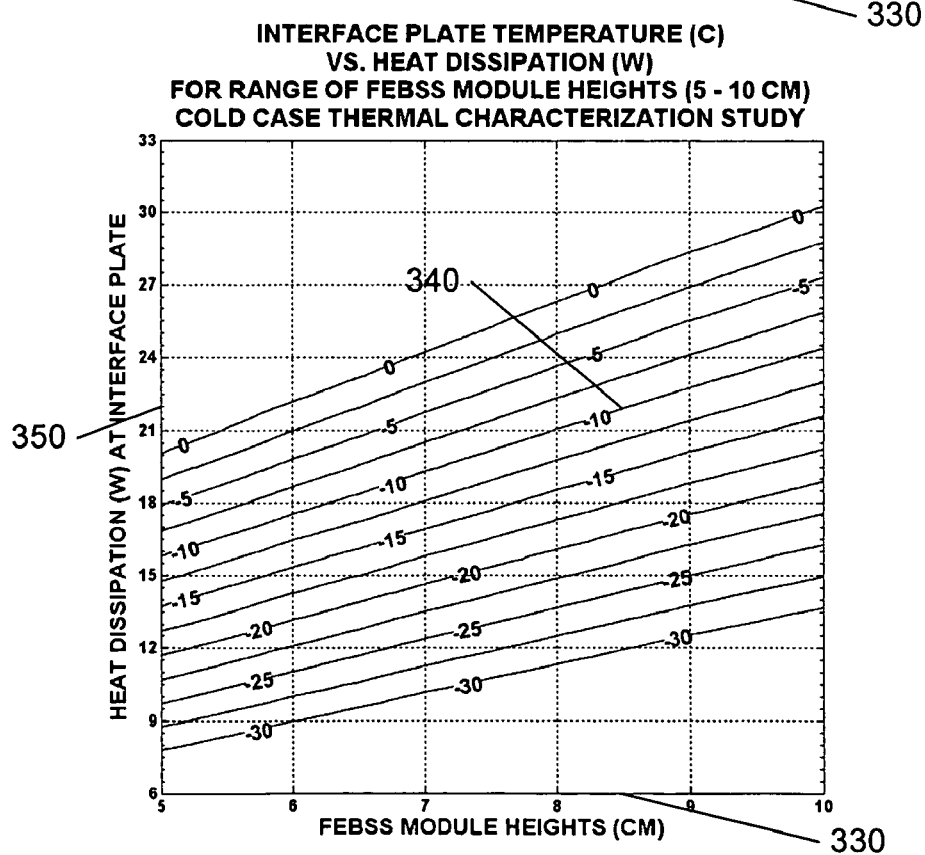
FIG. 3B illustrates an example worst-case cold characterization of an example baseplate and wall system in accordance with this invention.

FIG. 3B illustrates an example worst-case cold characterization of the example baseplate and wall system for the same orbit condition. As in FIG. 3A, the graph illustrates the expected temperature of the component interface plate as a function of the heat dissipated into the plate by the components (vertical axis), and the height of the walls (horizontal axis). Having previously determined the height of the walls, the designer uses this characterization to find a required heat dissipation into the plate to achieve a desired minimum temperature.

Continuing the example above, and assuming that a minimum temperature of −10° C. is required, the determined wall height 330 of 8.5 cm is identified on the horizontal axis, and the intercept 340 of this horizontal coordinate with the −10° C. loci of points is found. The corresponding vertical component 350 of this intercept 340 identifies the required heat dissipation into the component plate as 22 watts. That is, in order to assure that the component plate does not fall below −10° C., 22 watts of heat must be available on the component plate. Depending upon whether the aforementioned operational wattage of the components of 18 watts is a peak power or a continuous power, a heater that can provide at least 4 additional watts to the component plate is required.

Thus, by precharacterizing a base and wall system for worst-case hot and cold operational conditions, the thermal design of a module can be accomplished by merely determining a required height of the walls, and determining an amount of auxiliary heat to provide, if any. Other effects such as component duty cycles and power density, mounting interface thermal resistance, and reductions in radiator surface area, are also factored into the characterization of the system to allow for a complete operational scenario. As noted above, by providing a symmetric thermal arrangement, the determination and characterization of worst-case hot and cold operational conditions is greatly simplified.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

We claim:

1. A thermal base for use in a spacecraft, comprising:
a component interface plate that is configured to provide a mounting surface for spacecraft components,
a plurality of heat pipes that are thermally coupled to the component interface plate, each heat pipe of the plurality of heat pipes being coupled to a peripheral section of a plurality of peripheral sections of the base, wherein
the plurality of heat pipes are arranged on the component interface plate and on the plurality of peripheral sections so as to provide a substantially equal temperature on the component interface plate, regardless of which peripheral section having a coupled heat pipe is facing a source of environmental energy.

2. The base of claim 1, wherein
the peripheral sections of the plurality of peripheral sections are arranged substantially symmetrically about a periphery of the base.

3. The base of claim 2, wherein
the heat pipes of the plurality of heat pipes each have a common shape.

4. The base of claim 3, wherein
the heat pipes are arranged substantially symmetrically on the component interface plate.

5. The base of claim 2, wherein
the heat pipes are arranged substantially symmetrically on the component interface plate.

6. The base of claim 1, wherein
the heat pipes are arranged substantially symmetrically on the component interface plate.

7. The base of claim 1, wherein
the heat pipes of the plurality of heat pipes each have a common shape.

8. The base of claim 1, wherein
the base is substantially hexagonal in shape, and
the plurality of heat pipes consists of three heat pipes, symmetrically arranged on the base.

9. The base of claim 1, further including
a plurality of wall elements that are arranged substantially perpendicular to the base, each wall element being coupled to each of the plurality of heat pipes at the peripheral segment corresponding to each heat pipe.

10. The base of claim 9, wherein
each wall element has a common height, and
the common height is determined based on a maximum temperature at the component interface plate when any wall element is facing the source of solar energy.

11. The base of claim 10, wherein
the common height is also determined based on a maximum power output of the spacecraft components that are mounted on the component interface plate.

12. The base of claim 11, further including
a heating component having a power dissipation that is based on the common height and based on a minimum temperature at the component interface plate when none of the wall elements face the source of solar energy.

13. The base of claim 9, wherein
each wall element includes ribs that facilitate thermal transfer.

14. The base of claim 9, wherein
each wall element includes an interior surface that faces the component interface plate, and an exterior surface that faces away from the component interface plate, and
the interior surface is coated to facilitate thermal isolation, and
the exterior surface is coated to facilitate heat rejection.

15. The base of claim 1, further including
the components that are mounted on the component interface plate,
wherein
the components that are mounted are coated to facilitate thermal isolation.

16. The base of claim 1, wherein
the component interface plate is machined into the base.

17. The base of claim 1, wherein
the heat pipes include grooved aluminum extrusions, with ammonia as a working fluid within the heat pipes.

18. The base of claim 1, wherein
the periphery segments to which the heat pipes are coupled correspond to surfaces of the spacecraft at which gaps in deployed solar panels occur.

19. A method of assembling a spacecraft module, comprising:

selecting components for inclusion in the spacecraft module, selecting a base that is configured to facilitate mounting of the components, determining a maximum power dissipation of the components in an operational environment, selecting walls that are configured to thermally couple to the base, wherein a height of the walls is determined based on a predetermined characterization of the base, and on the power dissipation of the components, and independent of an expected orientation of the spacecraft in the operational environment, and assembling the components and the walls to the base to form the spacecraft module.

20. The method of claim 19, wherein
the height of the walls is further determined based on a maximum temperature to which the components are subjected in the operational environment.

21. The method of claim 20, further including
determining a required power dissipation by the components to assure a minimum temperature to which the components are subjected in the operational environment, based on the height of the walls, and the predetermined characterization of the base.

22. The method of claim 21 further including
selecting a heating component for mounting to the base to provide the required power dissipation to assure the minimum temperature.

23. A spacecraft module comprising:
a baseplate that includes:
 a component interface plate, and
 a plurality of heatpipes,
one or more components mounted on the component interface plate, and
a plurality of walls, each wall couple to a corresponding heatpipe of the plurality of heatpipes,
wherein
the heatpipes are arranged on the baseplate in a symmetric pattern.

24. The spacecraft module of claim 23, wherein
the heatpipes are arranged on the component interface plate in a symmetric pattern.

25. The spacecraft module of claim 23, wherein
the plurality of heatpipes includes at least three heatpipes.

26. The spacecraft module of claim 23, wherein
each wall has a common height, and
the height is based on a heat-dissipation of the components.

27. The spacecraft module of claim 26, wherein
the height is further based on a worst-case hot condition of the module.

28. The spacecraft module of claim 23, wherein
each wall has a common height, and
the height is based on a worst-case hot condition of the module.

29. The spacecraft module of claim 23, wherein
each wall has a common height, and
the components include a heating element having a heating capacity that is based on the height.

30. The spacecraft module of claim 29, wherein
the heating capacity is further based on a worst-case cold condition of the module.

* * * * *

UNITED STATES PATENT AND TRADEMARK OFFICE
CERTIFICATE OF CORRECTION

PATENT NO. : 7,191,984 B2  Page 1 of 1
APPLICATION NO. : 11/151908
DATED : March 20, 2007
INVENTOR(S) : Barton et al.

It is certified that error appears in the above-identified patent and that said Letters Patent is hereby corrected as shown below:

Col. 1 lines 6-8, should read,

<u>This invention was made with U.S. Government support under Contract No. FA9453-04-C-0218 awarded by the U.S. Air Force. The U.S. Government has certain rights in the invention.</u>

Signed and Sealed this

Twenty-ninth Day of September, 2009

David J. Kappos
*Director of the United States Patent and Trademark Office*